US009919630B2

(12) United States Patent
Takenaka et al.

(10) Patent No.: US 9,919,630 B2
(45) Date of Patent: Mar. 20, 2018

(54) FLOOR MAT FASTENING STRUCTURE

(71) Applicant: HONDA ACCESS CORP., Niiza-shi, Saitama (JP)

(72) Inventors: Shinpei Takenaka, Niiza (JP); Shinnosuke Takeda, Niiza (JP)

(73) Assignee: HONDA ACCESS CORP., Saitama (JP)

( * ) Notice: Subject to any disclaimer, the term of this patent is extended or adjusted under 35 U.S.C. 154(b) by 310 days.

(21) Appl. No.: 14/615,584

(22) Filed: Feb. 6, 2015

(65) Prior Publication Data
US 2016/0101717 A1 Apr. 14, 2016

(30) Foreign Application Priority Data
Oct. 8, 2014 (JP) .................................. 2014-207516

(51) Int. Cl.
*B60N 3/04* (2006.01)
*B60N 2/015* (2006.01)
*A47G 27/04* (2006.01)

(52) U.S. Cl.
CPC ............. *B60N 3/046* (2013.01); *B60N 2/015* (2013.01); *B60N 3/044* (2013.01)

(58) Field of Classification Search
CPC ........ B60N 3/046; B60N 3/044; B60N 3/048; B60N 2/015; Y10T 16/10; Y10T 428/24008
See application file for complete search history.

(56) References Cited

U.S. PATENT DOCUMENTS 1,433,788 A * 10/1922 Carr .................... A44B 17/0011
                                                     16/4
1,787,728 A * 1/1931 Hood ...................... A43C 11/08
                                                     16/4
(Continued)

FOREIGN PATENT DOCUMENTS

DE          2512484 A1      9/1976
DE          4409297 A1      9/1995
(Continued)

OTHER PUBLICATIONS

Extended Search Report dated Mar. 11, 2016, issued in counterpart European Patent Application No. 15153814.7. (6 pages).
Office Action dated Dec. 22, 2015, issued in counterpart Japanese Application No. 2014-207516, with English translation (6 pages).

*Primary Examiner* — Robert Sandy
*Assistant Examiner* — Matthew J Sullivan
(74) *Attorney, Agent, or Firm* — Westerman, Hattori, Daniels & Adrian, LLP

(57) ABSTRACT

Provided is a floor mat fastening structure capable of preventing a circumferential edge portion of a mat main body from rising. This structure is to fasten a mat main body laid on a vehicle floor. A fastening member(s) are provided on a rear circumferential edge of the mat main body. The front end region of this fastening member is provided with an insertion portion having a cutout opening section. The fastening member is sandwiched between the vehicle floor and a foot bracket fixed on the vehicle floor such that the rising of the mat main body due to a long period of use can be restricted, thereby ensuring the quality of the product. Each fastening member is formed into the shape of a sheet, and has a flat upper and lower surfaces. Thus, the fastening member can be easily inserted in between the vehicle floor and the foot bracket.

17 Claims, 8 Drawing Sheets

(56) References Cited

U.S. PATENT DOCUMENTS

| | | | | | |
|---|---|---|---|---|---|
| 1,792,304 | A | * | 2/1931 | Hood | A43C 11/08 |
| | | | | | 16/4 |
| 4,588,628 | A | * | 5/1986 | Roth | A47G 27/0412 |
| | | | | | 296/97.23 |
| 4,921,742 | A | * | 5/1990 | Altus | B60N 3/046 |
| | | | | | 428/101 |
| 5,093,958 | A | * | 3/1992 | Levine | A47G 27/0418 |
| | | | | | 16/4 |
| 5,636,408 | A | * | 6/1997 | Dichtel | A47G 27/0418 |
| | | | | | 16/6 |
| 5,724,703 | A | * | 3/1998 | Wu | B60N 3/046 |
| | | | | | 16/4 |
| 7,546,661 | B2 | * | 6/2009 | Connor, Jr. | B60N 3/046 |
| | | | | | 16/4 |
| 2009/0269546 | A9 | * | 10/2009 | Alford | B60N 3/046 |
| | | | | | 428/99 |
| 2011/0185537 | A1 | * | 8/2011 | Winters | B60N 3/04 |
| | | | | | 16/4 |
| 2013/0047372 | A1 | * | 2/2013 | Goto | B60N 3/046 |
| | | | | | 16/4 |
| 2013/0314933 | A1 | * | 11/2013 | Wang | B60R 1/1207 |
| | | | | | 362/494 |

FOREIGN PATENT DOCUMENTS

| | | |
|---|---|---|
| JP | H01-169446 U | 11/1989 |
| JP | 4-37033 U | 3/1992 |
| JP | 4833750 B2 | 12/2011 |

* cited by examiner

FLOOR MAT FASTENING STRUCTURE

BACKGROUND OF THE INVENTION

Field of the Invention

The present invention relates to a floor mat fastening structure for fastening a floor mat to a vehicle.

Description of Related Art

Conventionally, as such a type of structure, there has been known a fastening structure disclosed in Japanese Patent No. 4833750. This structure is a floor mat fastening structure for fastening to a floor surface a floor mat that is laid thereon. Particularly, this floor mat is obtained by adhesively laminating on the surface of a backing material a carpet made of a fabric material. Further, there is employed a vehicle-side cover member including a receiving portion formed as a mat receiving region having a floor elevation of H from the floor surface; and a flange portion formed as a mat entering region having a floor elevation of h which is smaller than the floor elevation H. As for the floor mat used in this structure, there are continuously provided on the backing material a molded rim portion that is established on the circumferential edge of the floor mat and has an elevation of T which is larger than the floor elevation h; and a flat portion that is established between the molded rim portion and the end portion of the carpet and has an elevation t which is equivalent to the floor elevation h. That is, the molded rim portion of the floor mat is to be fitted into the mat receiving region of the vehicle-side cover member.

SUMMARY OF THE INVENTION

According to Japanese Patent No. 4833750, the floor mat can be fastened in a stable manner by employing the structure where a region from the molded rim portion of the floor mat circumferential edge to the flat portion is fitted into the flange portion of the vehicle-side cover member.

However, the aforementioned fastening structure requires using a particular floor mat with the molded rim portion formed therearound. That is, a general floor mat cannot be used in this structure.

Further, there occur the following problems due to the fact that the vehicle-side cover member cannot be easily disposed in a lower region of a driver's seat or passenger seat of a vehicle, and that the rear circumferential edge portion of the floor mat cannot be fastened.

When a clearance between a vehicle floor and the floor mat is small, the rear circumferential edge portion of the floor mat laid may rise up from the vehicle floor, and the risen rear circumferential edge portion may interfere with a seat rail at the time of sliding the seat.

Thus, as a result of the seat rail's interfering with the rear circumferential edge portion of the floor mat, there occur problems such as a sliding defect of the seat and the adhesion of a grease of the seat rail to the floor mat.

Here, in view of the aforementioned problems, it is an object of the present invention to provide a floor mat fastening structure capable of preventing the rising of a circumferential edge portion of a mat main body.

In order to accomplish the aforementioned objective, the invention of a first aspect is a floor mat fastening structure for fastening a mat main body laid on a vehicle floor, including: at least one fastening member provided on a circumferential edge portion of the mat main body, the fastening member having a cutout opening section and being sandwiched in between the vehicle floor and a vehicle interior member fixed on the vehicle floor.

Further, according to the invention of a second aspect, the fastening member is horizontally pivotally coupled to the mat main body.

Furthermore, according to the invention of a third aspect, the fastening member is formed into the shape of a sheet, and has a flat upper surface and a flat lower surface.

Furthermore, according to the invention of a fourth aspect, the fastening member is formed into the shape of a sheet, and has a concavo-convex portion that is provided on an upper surface of the fastening member and is engageable with the vehicle interior member.

According to the floor mat fastening structure as set forth in the first aspect of the present invention, the fastening member is sandwiched between the vehicle floor and the vehicle interior member such that the rising of the mat main body due to a long period of use can be restricted, thus making it possible to ensure the quality of the product.

Further, according to the floor mat fastening structure as set forth in the second aspect of the present invention, since the fastening member is allowed to pivot in the horizontal direction, there can be addressed the variation(s) in the points where the fastening member is to be sandwiched between the vehicle interior member and the vehicle floor.

Furthermore, according to the floor mat fastening structure as set forth in the third aspect of the present invention, the fastening member can be easily inserted in between the vehicle interior member and the vehicle floor.

Furthermore, according to the floor mat fastening structure as set forth in the fifth aspect of the present invention, since the fastening member is to be engaged with the vehicle interior member, the fastening member cannot be easily disengaged from between the vehicle interior member and the vehicle floor.

DETAILED DESCRIPTION OF THE INVENTION

Figure 1:
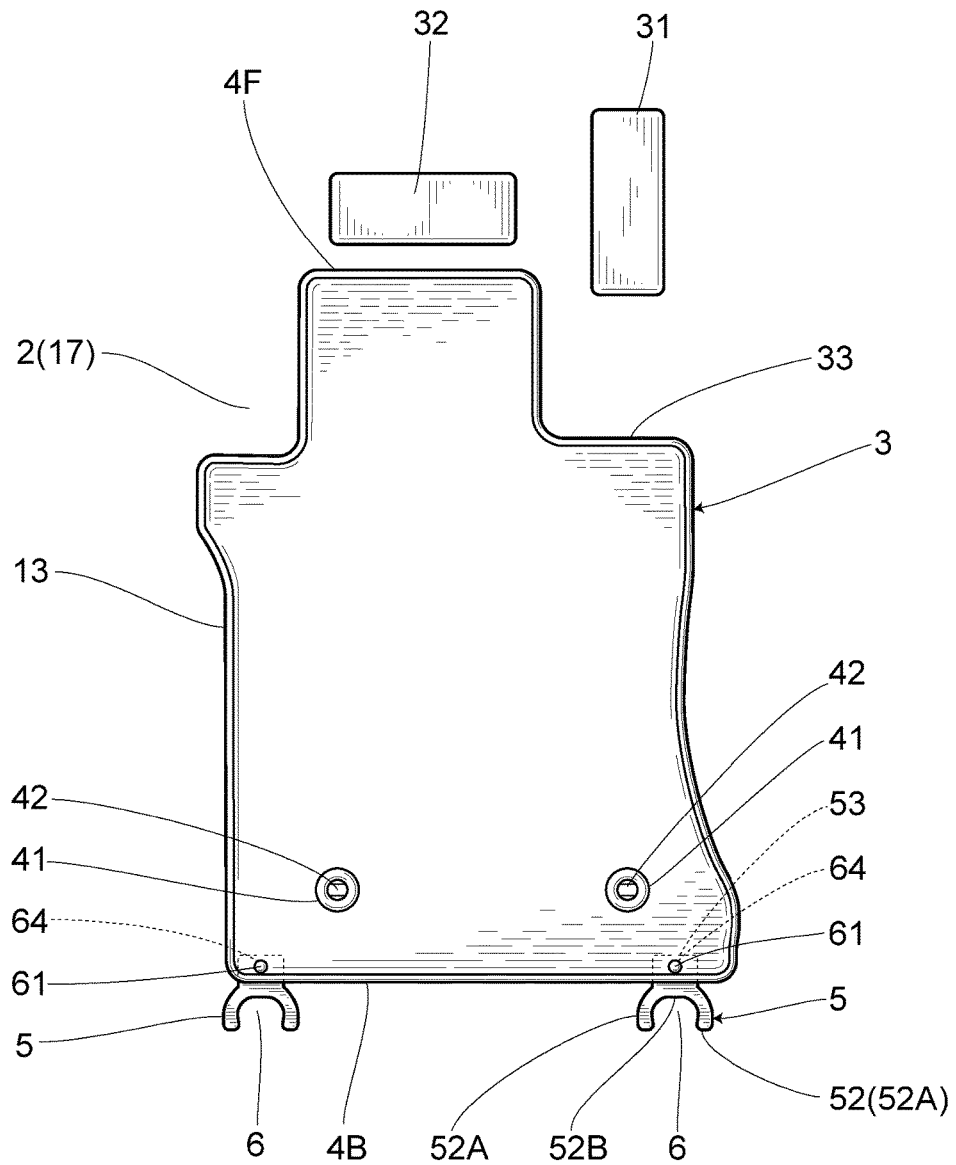
FIG. 1 is a planar view of a floor mat of a first embodiment of the present invention, the floor mat being arranged on the side of a driver's seat.

Embodiments of a floor mat fastening structure of the present invention are described hereunder with reference to the accompanying drawings.

First Embodiment

A first embodiment of the present invention is shown in FIG. 1 through FIG. 8. As shown in these drawings, a floor mat fastening structure 1 is a fastening structure for fastening a mat main body 3 laid on a vehicle floor 2 of an automotive vehicle. A floor mat used in the floor mat fastening structure 1 includes at least one fastening member 5 that is provided on and protrudes from a rear circumferential edge 4B as a circumferential edge portion of the mat main body 3. Each fastening member 5 has a cutout opening section 6. Particularly, the floor mat fastening structure 1 allows the fastening member 5 to be inserted in between the vehicle floor 2 and a foot bracket 7 as a vehicle interior member fixed to the vehicle floor 2. The fastening member 5 is thus fixed as a result of being sandwiched between these vehicle floor 2 and foot bracket 7. In this embodiment, the fastening member 5 is provided on both the left and right corner regions of the rear circumferential edge 4B.

The mat main body 3 includes a sheet-shaped base layer 11 that is provided on the lower region thereof; and an upper surface portion 12 that is provided on the upper region thereof and composed of a pile or raised material. The upper end of such pile or raised material is formed as a free end. Further, an overlock portion 13 obtained through fabric overlocking is established on the entire circumference of the circumferential edge portion of the mat main body 3.

Figure 4:
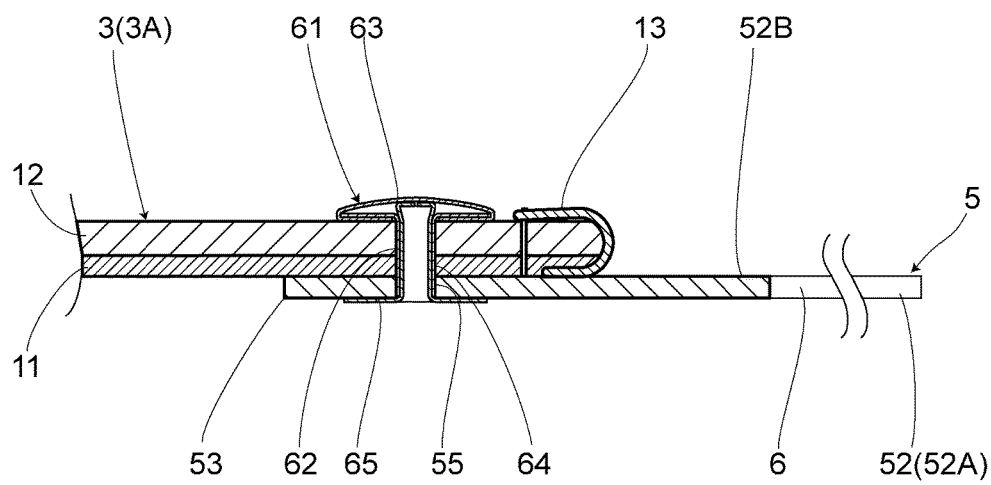
FIG. 4 is a cross-sectional view of a joining structure of the fastening member of the first embodiment of the present invention.
Figure 5:
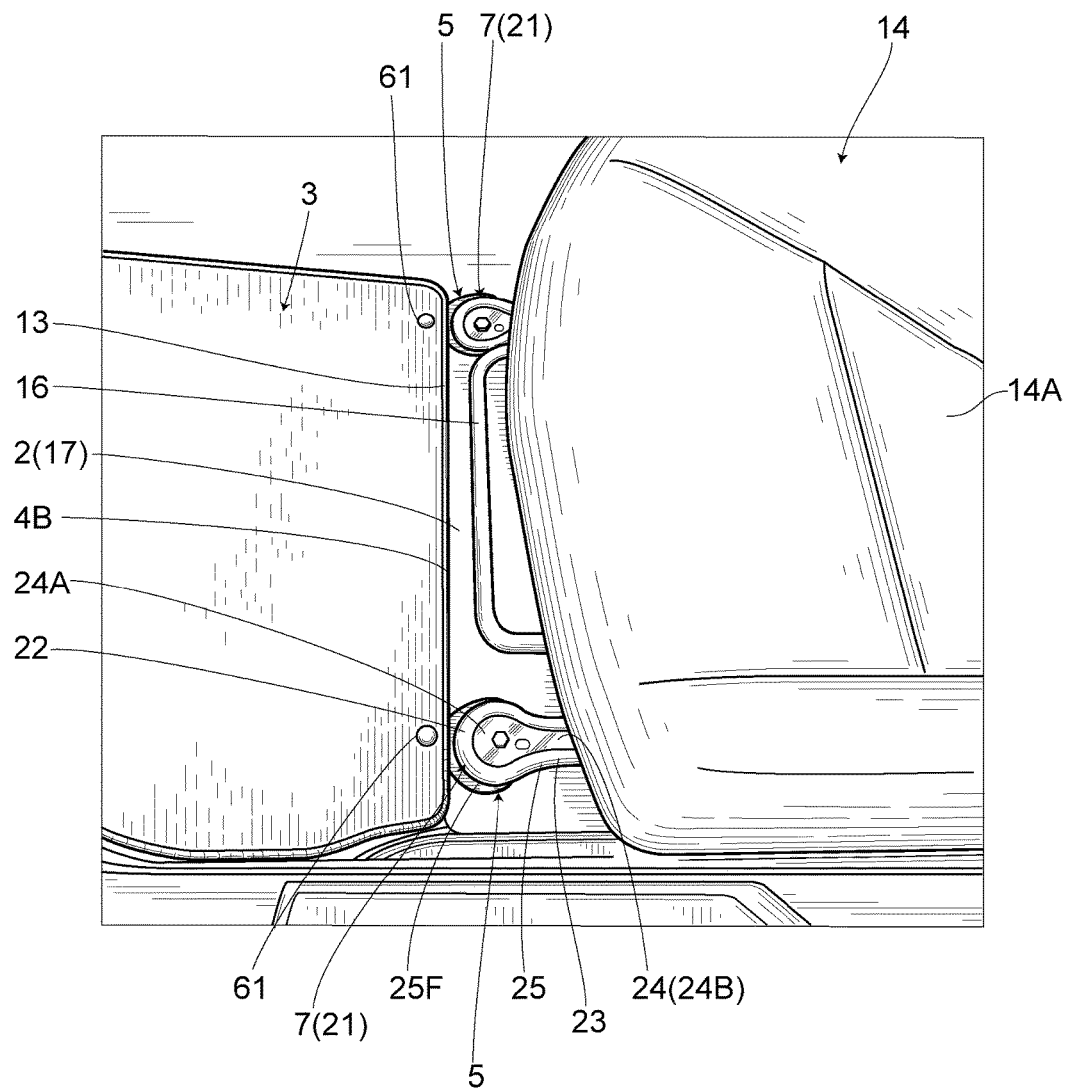
FIG. 5 is a perspective view of a fastened state of the first embodiment of the present invention.
Figure 6:
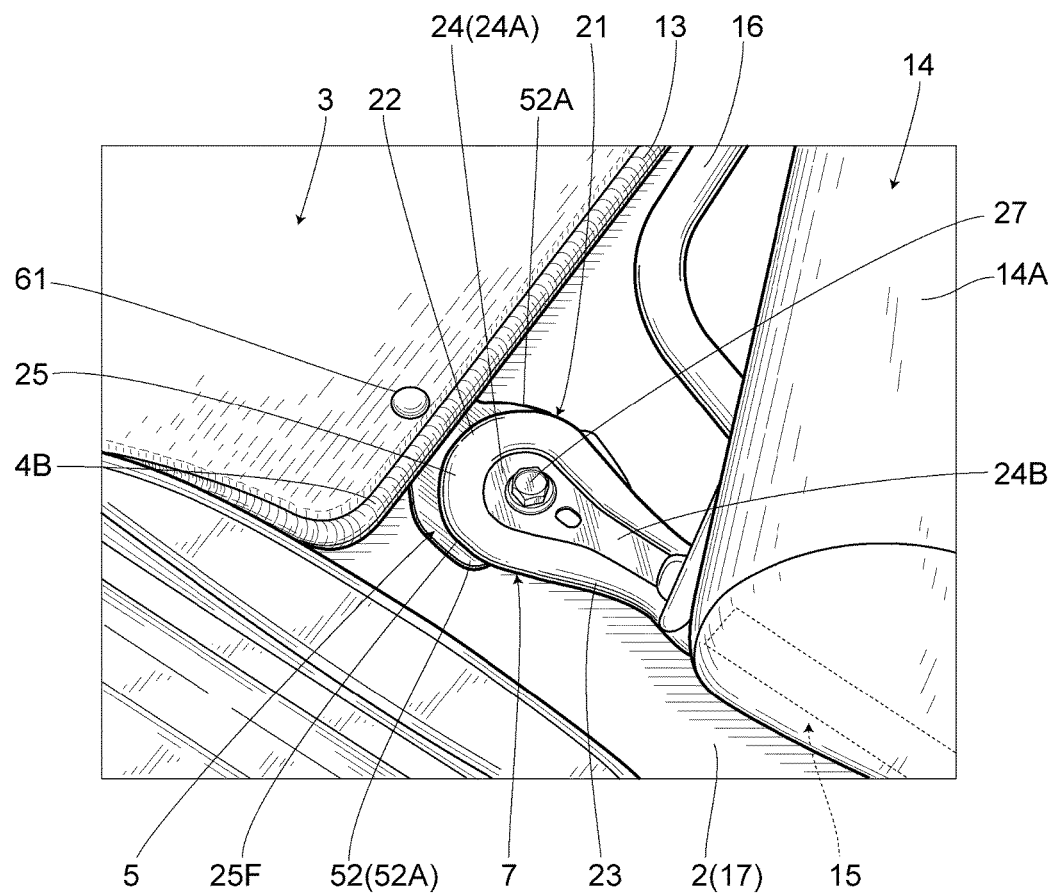
FIG. 6 is a perspective view of a fastened state of one of the fastening members of the first embodiment of the present invention.

A driver's seat 14 is shown in FIG. 4 and FIG. 5. This seat 14 is installed in a manner such that it can be slid back and forth on the vehicle floor 2 through a left and right seat rails 15, 15. Each seat rail 15 is composed of two elongated rails including a lower rail (not shown) and an upper rail (not shown). The two elongated rails are disposed along the front and rear direction of the vehicle. That is, the lower rail as a fixed rail is fixed to the vehicle floor 2, and the upper rail as a movable rail is fixed to the lower portion of a seating portion 14A of the seat 14, thus allowing the upper rail to be slid along the lower rail.

Further, an unlocking lever 16 is coupled to a locking mechanism established in the left and right seat rails 15, 15. This unlocking lever 16 is installed in a lower region of the front edge section of the seating portion 14A, and extends along a width direction of the seating portion 14A. Particularly, the left and right seat rails 15, 15 can be unlocked as a passenger seated in the seat 14 pulls the unlocking lever 16 upward.

Each foot bracket 7 is provided on the front side of the lower rail of each seat rail 15. This foot bracket 7 is fixed to the vehicle floor 2 and is located on the front side of the seating portion 14A. Further, a carpet 17 as an upper surface material is permanently laid on the upper surface of the vehicle floor 2, and the vehicle floor 2 is formed flat. Furthermore, the carpet 17 is made of an unwoven cloth or the like; and has a flexibility as well as a noise control function in terms of sound absorption and insulation.

Figure 8:
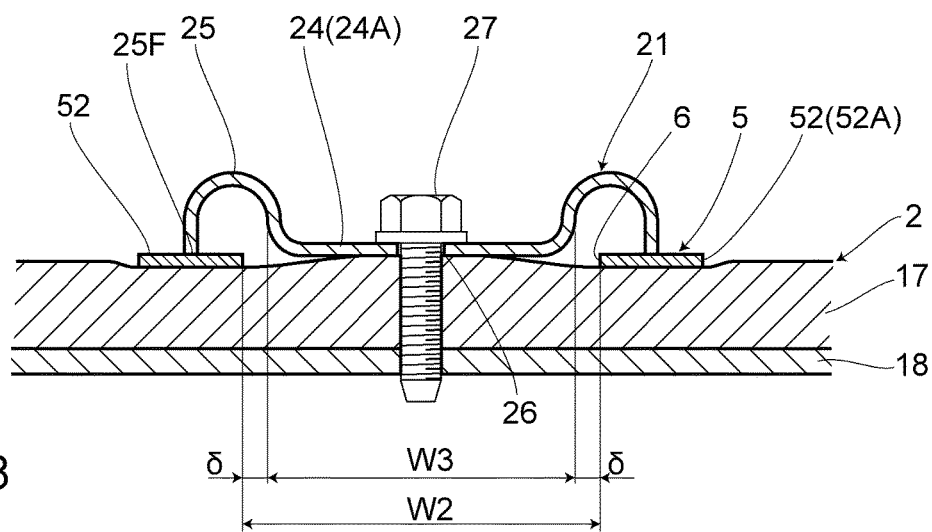
FIG. 8 is a cross-sectional view of a state of the first embodiment of the present invention, where the fastening member is sandwiched between a vehicle floor and a vehicle interior member.

The foot bracket 7 shown in FIG. 4, FIG. 5 and FIG. 8, for example, is made of a hard material such as a metal. Further, while the foot bracket 7 has its base end portion (facing the rear side of the vehicle) fixed to the lower rail, the front end portion thereof (facing the front side of the vehicle) is provided with a fastener 21 to be fastened to the vehicle floor 2. Such fastener 21 integrally includes a front end section 22 substantially formed into the shape of a circle when viewed from top; and a narrow width section 23 having a width narrower than the front end section 22 and being narrowed from the front end side toward the base end side. Here, the left-right width of the front end of the narrow width section 23 is formed narrower than the left-right width of the front end section 22.

As for the fastener 21, formed on the circumference of the flat bottom plate 24 is a curved brim 25 having an opened lower region and a cross-section that is substantially in the shape of "U." Moreover, since the curved brim 25 has a substantially constant width, a bottom-plate front end section 24A as the bottom plate 24 in the front end section 22 is also substantially formed into the shape of a circle when viewed from top, and a bottom-plate narrow width section 24B as the bottom plate 24 in the narrow width section 23 is also formed in a manner such that the bottom-plate narrow width section 24B is narrowed toward the base end side. Particularly, the lower surface of the bottom plate 24 and a lower edge 25F of the curved brim 25 are substantially formed at the same height. Further, it is preferred that either the entire or at least a part of the lower edge 25F of the front end section 22 be in contact with the carpet 17 before inserting the fastening member 5 in a fashion described later.

In addition, a through hole 26 is substantially bored in the center of the bottom-plate front end section 24A. A bolt 27 as a fixation member is to be inserted into such through hole 26. Particularly, this bolt 27 is to be inserted through the carpet 17 and a floor surface 18 underneath the carpet 17. That is, the fastener 21 is to be fixed to the vehicle floor 2 by, for example, screwing the bolt 27 into the floor surface 18 and allowing the same to be clamped therein; or screwing the bolt 27 into a nut (not shown). The floor surface 18 is made of a hard material such as a metal.

The mat main body 3 shown in FIG. 1 is flexible and is to be laid on the vehicle floor 2 of the driver's seat side of the vehicle. On the driver's seat side of the vehicle floor 2, provided on the right side is a gas pedal 31 elongated in the front-rear direction; whereas provided on the left side of this gas pedal 31 is a brake pedal 32 elongated in the left-right direction. Further, a recessed area 33 corresponding to the gas pedal 31 is formed on the front-right corner section of the mat main body 3. In addition, a front circumferential edge section 4F of the mat main body 3 is arranged in the vicinity of the brake pedal 32; and a clearance is established between the brake pedal 32 and the front circumferential edge section 4F of the mat main body 3, the clearance preventing the mat main body 3 and the brake pedal 32 from interfering with each other.

Moreover, provided on the rear left and right sides of the mat main body 3 are mat main body-side fastening members 41, 41 that are made of a synthetic resin or the like and are substantially formed into the shapes of cylinders. Particularly, each mat main body-side fastening member 41 has an insertion receiving portion 42 composed of a through hole or the like. More particularly, the carpet 17 of the vehicle floor 2 is equipped with at least one vehicle side fastening member (not shown), and each vehicle side fastening member is provided with an engagement portion (not shown) that can be inserted into and engage with the insertion receiving portion 42. Such engagement portion may be, for example, a protrusion that can be inserted into the insertion receiving portion 42; or a locking lever that can engage with or disengage from the insertion receiving portion 42.

Figure 3:
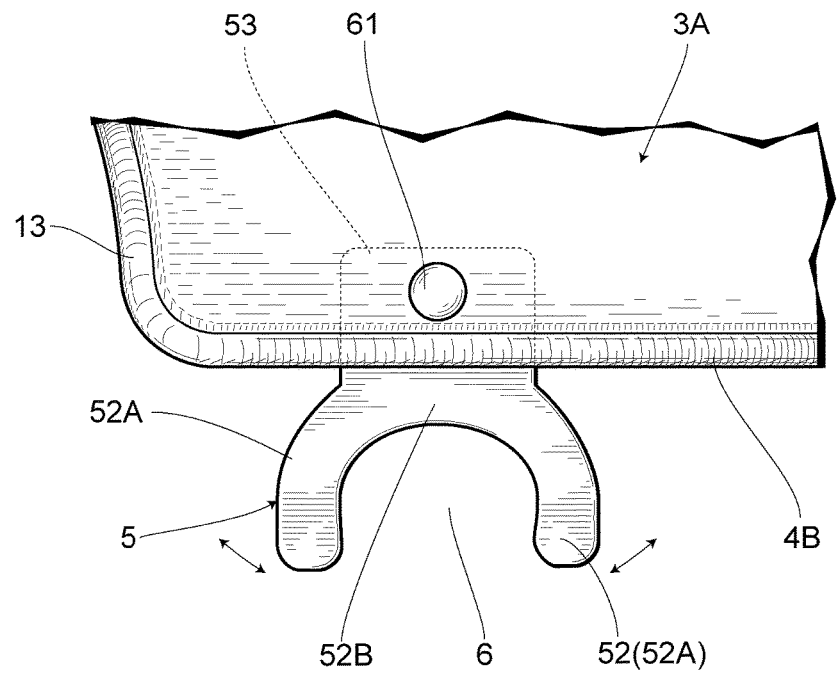
FIG. 3 is a planar view of a fastening member of the first embodiment of the present invention.
Figure 7:
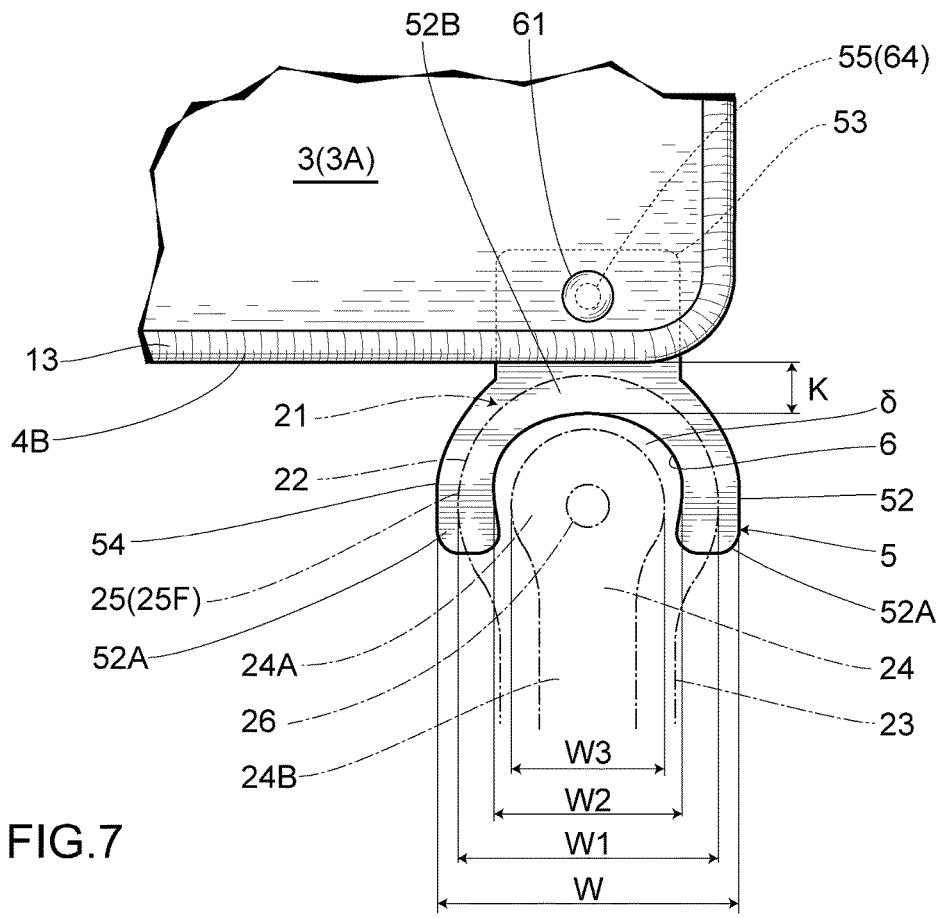
FIG. 7 is a planar view of the fastened state of one of the fastening members of the first embodiment of the present invention.

Each of the aforementioned fastening members 5 is flexible and made of a sheet material such as a synthetic resin; and has a thickness of about 1 to 2 mm. As shown in FIG. 3 and FIG. 7, for example, each fastening member 5 integrally includes an insertion portion 52 that is substantially formed into the shape of "C" and has the cutout opening section 6 established by having the front end side (facing the rear side of the vehicle) of the fastening member 5 opened; and a joining portion 53 provided on the base end side (facing the front side of the vehicle) of the fastening member 5. Further, the insertion portion 52 is composed of a left and right arc-shaped insertion arm portions 52A, 52A that are coupled to each other through an insertion base end portion 52B. Furthermore, the insertion portion 52 is formed into a shape matched to the shape of the fastener 21 of the foot bracket 7. Here, the insertion portion 52 is formed larger than a semicircle.

As shown in FIG. 7, a largest left-right width W2 of the cutout opening section 6 is larger than a left-right width W3 of the bottom-plate front end section 24A; and a left-right width W of an outer edge 54 of the insertion portion 52 is larger than a left-right width W1 of the front end section 22. Further, the left-right width W2 of the cutout opening section 6 is smaller than the left-right width W1 of the front end section 22. Here, although a left-right width established on the front end region of the cutout opening section 6 is slightly smaller than the left-right width W2, the left-right width W3 of the bottom-plate front end section 24A is smaller than such left-right width established on the front end. In this way, the cutout opening section 6 is formed larger than the bottom-plate front end section 24A, thus allowing the bottom-plate front end section 24A to be inserted into the cutout opening section 6 from the front end side of the insertion portion 52. Moreover, the front end section 22 is formed larger than the cutout opening section 6; and the insertion portion 52 is formed larger than the front end section 22. As for the fastening member 5, the outer edge 54 of the insertion portion 52 is configured in a manner such that it surrounds the front end section 22 of the fastener 21 when mounted; and the cutout opening section 6 is configured in a manner such that it surrounds the bottom-plate front end section 24A when mounted.

This structure allows the lower edge 25F of the front end section 22 to be inserted and arranged in a manner such that the lower edge 25F can abut against the upper surfaces of the left and right insertion arm portions 52A, 52A and the upper surface of the insertion base end portion 52B. Further, as shown in FIG. 7 and FIG. 8, a clearance 6 is formed between the cutout opening section 6 and the bottom-plate front end section 24A. This clearance 6 serves to absorb the differences in the left-right and front-rear dimensions of the fastening member 5 and the fastener 21.

Further, in this embodiment, the width of the joining portion 53 is formed narrower than the left-right width of the insertion portion 52. A through hole 55 is bored in the center of the joining portion 53 along the left-right direction thereof. Particularly, when the mat main body 3 is in a fastened state, the insertion portion 52 is arranged in a way such that the insertion portion 52 surrounds the bottom-plate front end section 24A, and the bottom-plate front end section 24A is loosely engaged inside the cutout opening section 6.

Each fastening member 5 is fixed to the mat main body 3, 3A through a rivet member 61 such as a rivet. The rivet member 61 includes a shaft main body 62 and; a large-diameter head portion 63 that is provided on the upper portion of the shaft main body 62 and is formed into the shape of a plate. Here, the upper surface of the large-diameter head portion 63 is formed into a curved surface. Moreover, at least one through hole 64 matched to the through hole 55 of the fastening member 5 is bored in the mat main body 3. That is, the shaft main body 62 is to be inserted through these through holes 55 and 64, followed by squashing the lower portion of the shaft main body 62 such that the diameter thereof expands to form a rivet portion 65 that is arranged along the lower surface of the fastening member 5.

In this way, the fastening member 5 is coupled and fixed to the lower surface of the mat main body 3 with the upper surface of the fastening member 5 on the side of the joining portion 53 substantially being in close contact with the lower surface of the mat main body 3. In such fixed state, the insertion portion 52 protrudes outward from the end portion of the rear circumferential edge 4B; and the fastening member 5 is capable of pivoting in a horizontal direction around the shaft main body 62, thus allowing the front end portion of the fastening member 5 to swing in the left-right direction.

In addition, as shown in FIG. 7, in the fixed state, a clearance K is established between the base end of the cutout opening section 6 and the end portion of the rear circumferential edge 4B. As shown in FIG. 1, the distance between the left and right through holes 64, 64 of the mat main body 3 is larger than the distance between the insertion receiving portions 42, 42 of the left and right mat main body-side fastening members 41, 41. Further, the left and right through holes 64, 64 are provided outward in the left-right direction, as compared to the insertion receiving portions 42, 42 of the left and right mat main body-side fastening members 41, 41. Since the fastening members 5 are thus installed outward as compared to the locations of the insertion receiving portions 42, the corner regions of the rear circumferential edge 4B of the mat main body 3 can be effectively restricted from rising up.

Figure 2:
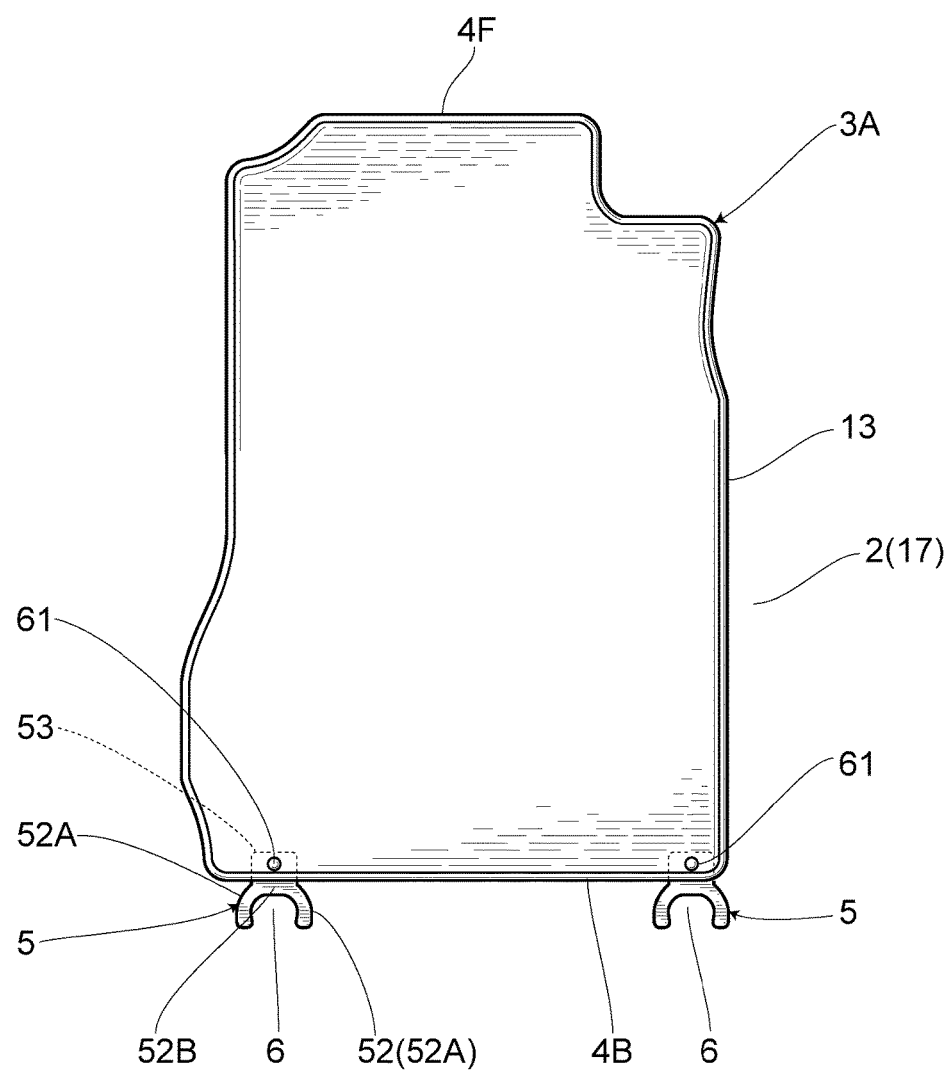
FIG. 2 is a planar view of another floor mat of the first embodiment of the present invention, the floor mat being arranged on the side of a passenger seat.

The mat main body 3A shown in FIG. 2 is to be laid on the vehicle floor 2 of the passenger seat side of the vehicle, and has the same structure as the mat main body 3 except that the planar shape of the mat main body 3A is different from that of the mat main body 3, and that no mat main body-side fastening member 41 is provided. Further, the fastening members 5, 5 are coupled to the left and right sides of the rear circumferential edge 4B of the mat main body 3A. Here, it is preferred that the fastening members 5, 5 be arranged in the vicinity of the corners of the rear circumferential edge 4B of the mat main body 3A. In this way, the corner regions of the rear circumferential edge 4B of the mat main body 3A can be effectively prevented from rising up. Although not shown in the drawings, the passenger seat can also be slid back and forth through the seat rails 15, 15 as is the case with the seat 14, and the front end portion of each seat rail 15 is fixed to the vehicle floor 2 through the foot bracket 7.

Described hereunder is a method for fastening the mat main body 3, 3A to the vehicle floor 2. The front end region of the insertion portion 52 of each fastening member 5, is to be inserted in between the carpet 17 and the lower edge 25F of the fastener 21. Here, although the fastener 21 is made of a hard material, the insertion portion 52 can be smoothly inserted in between the carpet 17 and the lower edge 25F of the fastener 21 since the carpet 17 is soft and each fastening member 5 is formed into the shape of a thin sheet. Next, the insertion portion 52 is inserted in a manner such that the lower edge 25F abuts against the upper surfaces of the left and right insertion arm portions 52A, 52A and insertion base end portion 52B. There, under such condition, the insertion portion 52 surrounds the bottom-plate front end section 24A such that the clearance 6 is formed between the cutout opening section 6 and the bottom-plate front end section 24A. Further, after being inserted in between the carpet 17 and the lower edge 25F of the fastener 21, the fastening member 5 can be reliably sandwiched therebetween due to the elasticity of the carpet 17.

In this case, each fastening member 5 is provided on the mat main body 3, 3A in a way such that the fastening member 5 is pivotable around the rivet member 61 in the horizontal direction. For this reason, even when there exists an errors) in, for example, the clearances between the left/right foot brackets 7 and the left/right fastening members 5, 5, the fastening members 5, 5 are allowed to pivot in the horizontal direction such that a variation(s) can be absorbed, thereby allowing fastening to take place smoothly.

Moreover, as for the mat main body 3 equipped with the mat main body-side fastening members 41, the left and right mat main body-side fastening members 41, 41 allow the mat main body 3 to be positioned on the vehicle floor 2 in the left-right direction. Thus, even if there exists an errors) between the positions of the fastening members 5, 5 and the positions of the left/right foot brackets 7, 7 in such positioned state, this error(s) can be absorbed as the fastening members 5, 5 pivot in the horizontal direction.

In this way, each fastening member 5 is to be sandwiched between the carpet 17 of the vehicle floor 2 and the fastener 21 of each foot bracket 7 such that the fastening member 5 can be fixed in the vertical direction. This restricts the rear circumferential edge 4B side of the mat main body 3 from rising up from the vehicle floor 2.

That is, in this embodiment and as set forth in claim 1, provided is the fastening structure for fastening the mat main body 3, 3A laid on the vehicle floor 2. Particularly, at least one fastening member 5 is provided on the rear circumferential edge 4B as the circumferential edge portion of the mat main body 3, 3A. Each fastening member 5 has the cutout opening section 6, and is sandwiched between the vehicle floor 2 and the foot bracket 7 that is fixed on the vehicle floor 2 and serves as a vehicle interior member. Therefore, the mat main body 3, 3A can be restricted from rising up after, for example, a long period of use, thus ensuring the quality of the product.

Further, the mat main body 3, 3A and the seat rails 15 can be prevented from interfering with each other as the seat rails 15 of the mat main body 3, 3A are slid, thus ensuring the quality of the product.

Furthermore, the sliding function can be prevented from being impaired as the mat main body 3, 3A bites into the seat rails 15.

Furthermore, the lubricant applied on the seat rails 15 can be prevented from adhering to the mat main body 3, 3A as the mat main body 3, 3A and the seat rails 15 come into contact with each other when sliding the seat rails 15.

Furthermore, in this embodiment and as set forth in claim 2, each of the fastening members 5 is coupled to the mat main body 3, 3A in the manner such that the fastening member 5 can pivot in the horizontal direction. Thus, there can be addressed the variation(s) in the points where the fastening member 5 is to be sandwiched between the vehicle floor 2 and the foot bracket 7 as a vehicle interior member.

Furthermore, in this embodiment and as set forth in claim 3, each fastening member 5 is formed into the shape of a sheet, and the upper and lower surfaces of such fastening member 5 are flat. Thus, the fastening member 5 can be easily inserted in between the vehicle floor 2 and the foot bracket 7 as a vehicle interior member.

The effects of this embodiment are as follows. That is, as for the insertion portion 52, the left and right insertion arm portions 52A, 52A are coupled to each other through the insertion base end portion 52B established on the base end region of the insertion portion 52. The insertion portion 52 is to be inserted under the front end section 22 in the way such that the lower edge 25F of the front end section 22 abuts against the upper surfaces of the left/right insertion arm portions 52A, 52A and the insertion base end portion 52B. Thus, the fastening member 5 can be reliably sandwiched between the vehicle floor 2 and the foot bracket 7. In addition, since the fastening member 5 is attached to the mat main body 3, 3A through the rivet member 61 having the shaft main body 62 as the rotation central shaft, the fastening member 5 can thus be pivotally coupled to the mat main body 3, 3A. Here, since the width of the joining portion 53 is formed narrower than that of the insertion portion 52, the fastening members 5 can be easily attached to the left and right edge portions of the mat main body 3, as shown in FIG. 7. Moreover, as for each fastening member 5, the outer edge 54 of the insertion portion 52 is formed into the shape surrounding the front end section 22 of the fastener 21 in an attached state; and the cutout opening section 6 is formed into the shape surrounding the bottom-plate front end section 24A in the attached state, thereby realizing a reliable attached state.

Second Embodiment

Figure 9:
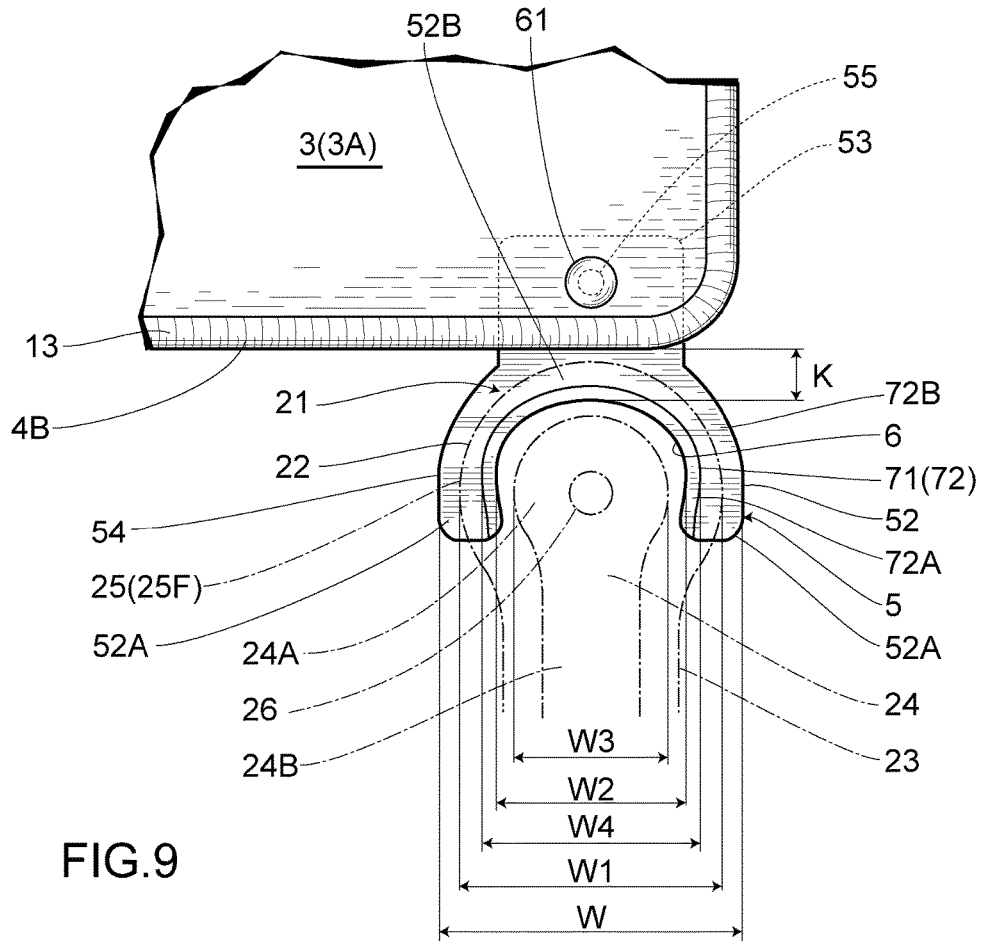
FIG. 9 is a planar view of a fastened state of a second embodiment of the present invention.
Figure 10:
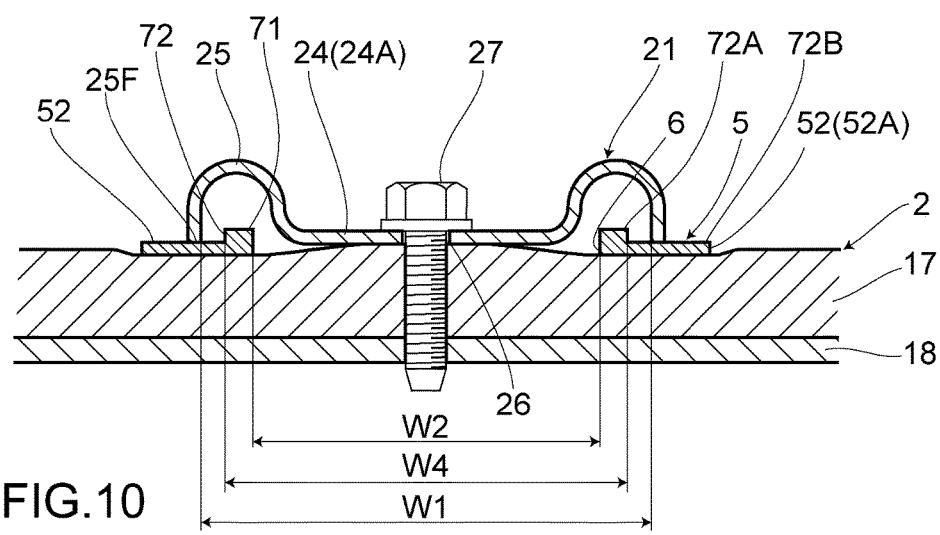
FIG. 10 is a cross-sectional view of a state of the second embodiment of the present invention, where the fastening member is sandwiched between the vehicle floor and the vehicle interior member.

A second embodiment of the present invention is shown in FIG. 9 and FIG. 10. Here, elements identical to those of the first embodiment are given identical symbols, and the detailed descriptions of such elements are thus omitted. In this embodiment, a concavo-convex portion 71 is provided on the upper surface of the insertion portion 52. Particularly, the concavo-convex portion 71 is established as follows. That is, a step portion 72 substantially formed into the shape of "C" is provided on a region of the upper surface of the insertion portion 52 that is on the side of the cutout opening section 6. Here, the inner section of such step portion 72 is formed as a convex portion 72A, whereas the outer section thereof is formed as a concave portion 72B. Further, a left-right width W4 of the step portion 72 is formed smaller than the width W1, and the convex portion 72A is thus received inside the lower edge 25F of the front end section 22 in the attached state.

Therefore, even when the insertion portion 52 has become dislocated, the lower edge 25F will be clamped to the step portion 72 such that disengagement could hardly occur.

That is, the present embodiment brings about the function effects similar to those of the first embodiment.

Further, in this embodiment and as set forth in claim 5, each fastening member 5 is formed into the shape of a sheet, and provided on the upper surface of the fastening member 5 is the concavo-convex portion 71 engageable with the foot bracket 7 as a vehicle interior member. For this reason, the fastening member 5, when engaged with the foot bracket 7, cannot be easily disengaged from between the foot bracket 7 and the vehicle floor 2.

Third Embodiment

Figure 11:
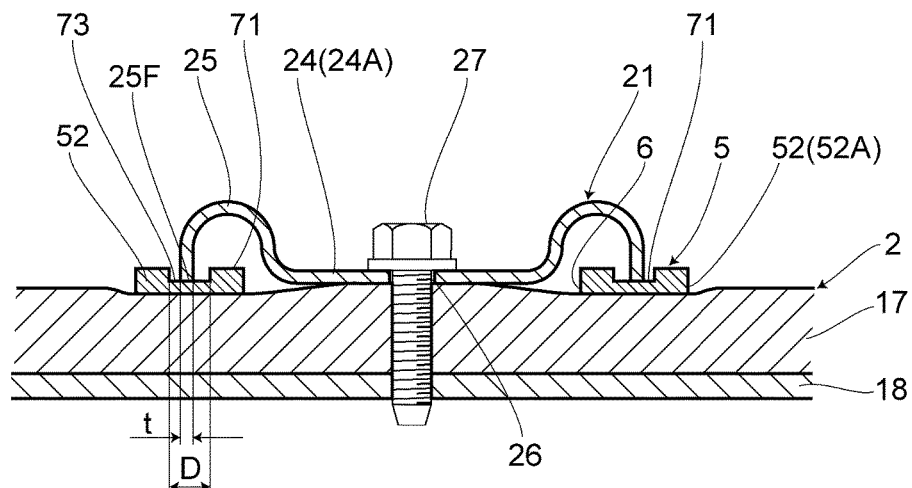
FIG. 11 is a cross-sectional view of a state of a third embodiment of the present invention, where the fastening member is sandwiched between the vehicle floor and the vehicle interior member.

A third embodiment of the present invention is shown in FIG. 11. Here, elements identical to those of the aforementioned embodiments are given identical symbols, and the detailed descriptions of such elements are thus omitted. In this embodiment, the concavo-convex portion 71 is provided on the upper surface of the insertion portion 52. Particularly, the concavo-convex portion 71 is formed as follows. That is, a groove-shaped concave portion 73 is formed on the central region of the upper surface of the insertion portion 52 along the width direction thereof, and both sides of the groove-shaped concave portion 73 along the width direction thereof are formed as convex portions. Further, the groove-shaped concave portion 73 is formed into a shape that matches to the lower edge 25F of the front end section 22, and the lower edge 25F is to be engaged with the inner region of the groove-shaped concave portion 73. Here, a width dimension D of the groove-shaped concave portion 73 is larger than a thickness dimension t of the lower edge 25F.

In this way, this embodiment brings about the function effects similar to those of the first embodiment.

Further, in this embodiment and as set forth in claim 5, each fastening member 5 is formed into the shape of a sheet, and provided on the upper surface of the fastening member 5 is the concavo-convex portion 71 having the groove-shaped concave portion 73 that is engageable with the foot bracket 7 as a vehicle interior member. For this reason, the fastening member 5, when engaged with the foot bracket 7, cannot be easily disengaged from between the foot bracket 7 and the vehicle floor 2.

Further, in this embodiment, since the lower edge 25F is to be engaged with the inner region of the groove-shaped concave portion 73 in an embedded manner, not only disengagement can be prevented, but the lower edge 25F can also be positioned through the groove-shaped concave portion 73.

Fourth Embodiment

Figure 12:
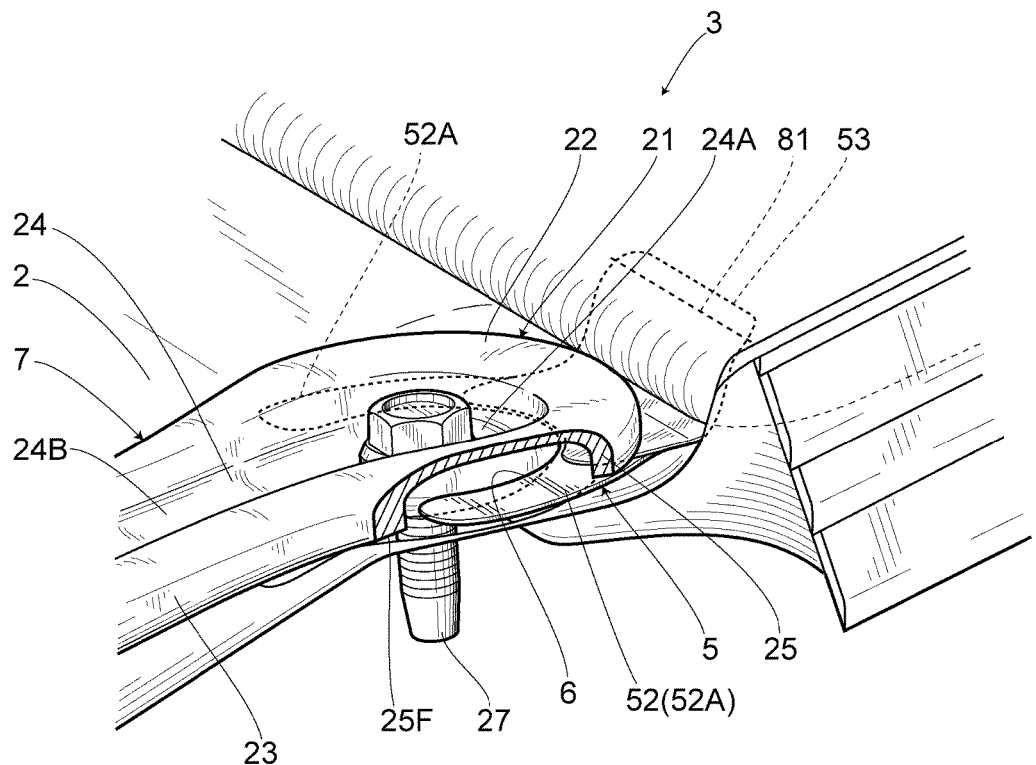
FIG. 12 is a perspective view of a fastened state of the fastening member of a fourth aspect of the present invention, the perspective view being obtained by virtually partially cutting out the vehicle interior member.

A fourth embodiment of the present invention is shown in FIG. 12. Here, elements identical to those of the aforementioned embodiments are given identical symbols, and the detailed descriptions of such elements are thus omitted. FIG. 12 is a reference drawing showing a usage state. In this embodiment, the joining portion 53 of the fastening member 5 is stitched and thus coupled to the mat main body 3 through a stitched portion 81. That is, the fastening member 5 may also be coupled to the mat main body 3 through a method other than that employing the rivet member.

However, the present invention is not limited to the aforementioned embodiments. In fact, various modifications can be made within the scope of the invention. For example, the shape of the fastening member shall not be limited to that of the abovementioned embodiments. The fastening member may be formed into various kinds of shapes including a "U" shape, a toppled "U" shape, a horseshoe shape and so on. And, it is preferred that the shape of the fastening member be that matched to vehicle interior member(s). Further, the material of the fastening member can be appropriately selected. Furthermore, although multiple fastening members are provided on the mat main body in each of the aforementioned embodiments, there may also be used only one fastening member.

What is claimed:

1. A floor mat, comprising:
   a floor mat main body; and
   at least one fastening member coupled to the floor mat main body,
   wherein the at least one fastening member comprises a generally U-shaped portion,
   wherein the generally U-shaped portion extends outward from a circumferential edge portion of the floor mat main body,
   wherein a cutout opening section of the generally U-shaped portion faces away from the floor mat main body,
   wherein the fastening member is configured to be sandwiched in between a vehicle floor and a foot bracket fixed on the vehicle floor, and
   wherein said foot bracket is provided on a front end section of a seat rail through which a seat is provided on the vehicle floor.

2. The floor mat according to claim 1, wherein said fastening member is horizontally pivotally coupled to said mat main body.

3. The floor mat according to claim 1, wherein said fastening member is formed into the shape of a sheet, and has a flat upper surface and a flat lower surface.

4. The floor mat according to claim 2, wherein said fastening member is formed into the shape of a sheet, and has a flat upper surface and a flat lower surface.

5. The floor mat according to claim 1, wherein said fastening member is formed into the shape of a sheet, and has a concavo-convex portion that is provided on an upper surface of said fastening member and is engageable with said foot bracket.

6. The floor mat according to claim 2, wherein said fastening member is formed into the shape of a sheet, and has a concavo-convex portion that is provided on an upper surface of said fastening member and is engageable with said foot bracket.

7. The floor mat according to claim 1, wherein said fastening member comprises:
   an insertion portion that has said cutout opening section and is inserted in between the vehicle floor and said foot bracket; and
   a joining portion provided integrally with said insertion portion on a base end side, said joining portion being coupled to said mat main body.

8. The floor mat according to claim 7, wherein said insertion portion is formed by coupling left and right insertion arm portions to each other through an insertion base end portion.

9. The floor mat according to claim 1, wherein said fastening member is sandwiched in between said foot bracket and a flexible carpet laid on the vehicle floor.

10. The floor mat according to claim 1, wherein said fastening member is provided on both left and right sides of the circumferential edge portion of said mat main body.

11. The floor mat according to claim 2, wherein said fastening member is coupled to the mat main body through a rivet member in a manner such that said fastening member is allowed to pivot in a horizontal direction.

12. The floor mat according to claim 1, wherein said foot bracket includes a fastener that is provided on a front end section thereof and fastened to the vehicle floor, and said fastening member is sandwiched in between the vehicle floor and said fastener.

13. The floor mat according to claim 12, wherein said fastener comprises a curved brim that has an opened lower region and is formed on a circumference of a flat bottom plate of said fastener, and said fastening member is sandwiched in between the vehicle floor and a lower edge of said curve brim.

14. The floor mat according to claim 13, wherein said curved brim has a cross-section that is substantially in the form of U.

15. The floor mat according to claim 13, wherein said lower edge of said curved brim is formed larger than said cutout opening section.

16. The floor mat according to claim 5, wherein said fastening member comprises:
   an insertion portion that has said cutout opening section and is inserted in between the vehicle floor and said foot bracket; and
   said concavo-convex portion as a step portion formed on an upper surface of said insertion portion, said step portion having an inner convex portion and an outer concave portion.

17. The floor mat according to claim 5, wherein said fastening member comprises:
   an insertion portion that has said cutout opening section and is inserted in between the vehicle floor and said foot bracket; and
   said concavo-convex portion provided on an upper surface of said insertion portion, said concavo-convex portion having:
      a groove-shaped concave portion formed on a central region of said insertion portion upper surface along a width direction thereof; and
      a convex portion formed on both sides of said groove-shaped concave portion along a width direction thereof.

* * * * *